United States Patent [19]
Daniel et al.

[11] Patent Number: 5,177,485
[45] Date of Patent: Jan. 5, 1993

[54] METHOD OF SCRAMBLING PAL, SECAM AND NTSC COMPOSITE VIDEO SIGNALS AND DECODER OF SIGNALS SCRAMBLED BY THIS METHOD

[75] Inventors: Patrick Daniel, Strasbourg; Jean-Claude Guillon, Gerstheim, both of France

[73] Assignee: Laboratoire Europeen de Recherches Electroniques Avancees, Courbevoie, France

[21] Appl. No.: 566,346

[22] PCT Filed: Dec. 8, 1989

[86] PCT No.: PCT/FR89/00637
§ 371 Date: Jul. 30, 1991
§ 102(e) Date: Jul. 30, 1991

[87] PCT Pub. No.: WO90/07846
PCT Pub. Date: Jul. 12, 1990

[30] Foreign Application Priority Data
Dec. 23, 1988 [FR] France .................. 88 17093

[51] Int. Cl.⁵ ............................ H04N 7/167
[52] U.S. Cl. ........................... 380/14; 380/11
[58] Field of Search ........................ 380/14, 11

[56] References Cited

U.S. PATENT DOCUMENTS

| | | |
|---|---|---|
| 2,847,768 | 8/1958 | Bridges. |
| 4,563,702 | 1/1986 | Heller et al. ............... 380/14 X |
| 4,673,975 | 6/1987 | Inaba et al. ................ 380/14 |
| 4,736,420 | 4/1988 | Katznelson et al. ......... 380/11 |
| 4,916,736 | 4/1990 | Ryan ........................ 380/11 |

FOREIGN PATENT DOCUMENTS

0127383 12/1984 European Pat. Off.
3600326 7/1986 Fed. Rep. of Germany.

OTHER PUBLICATIONS

International Conference on Secure Communication systems, Feb. 22–23, 1984, IEEE (New York, US) N. Lodge et al.: "Vision scrambling of C-MAC DBS signals", pp. 59–65.

*Primary Examiner*—Gilberto Barrón, Jr.
*Attorney, Agent, or Firm*—Oblon, Spivak, McClelland, Maier & Neustadt

[57] ABSTRACT

The method of the invention consists in shifting (a) the start of the scrambled section of a composite video line of a tlevision image with respect to the start of the useful part of that line.

7 Claims, 3 Drawing Sheets

METHOD OF SCRAMBLING PAL, SECAM AND NTSC COMPOSITE VIDEO SIGNALS AND DECODER OF SIGNALS SCRAMBLED BY THIS METHOD

BACKGROUND OF THE INVENTION

1. Field of the Invention

The present invention relates to a method of scrambling PAL, SECAM and NTSC composite video signals and to a decoder of signals scrambled by this method.

2. Discussions of the Background

A large number of methods are known for scrambling the video signals of television images in a pay television system. Among these methods there is known a method of scrambling by circular on-line permutation. This known method, while allowing a scrambling of the image, is not a priori shielded from any "pirating" because of certain temporal characteristics of the scrambled signal which are easy to locate.

SUMMARY OF THE INVENTION

The subject of the present invention is a method of scrambling television images which makes the received images unrecognizable and very difficult to unscramble by an unauthorized user, and which is appropriate for PAL as well as SECAM or NTSC video signals. The subject of the invention is also a decoder for signals thus scrambled which is both simple and inexpensive.

The scrambling method according to the invention consists in shifting the start of the scrambled zone of each line with respect to the start of the line.

According to one aspect of the method of the invention, the shift of the start of the scrambled zone varies in the course of time. Advantageously, this shift changes value every 40 ms.

According to yet another aspect of the method of the invention, the complete non-scrambled section of each useful line is delayed on transmission and this delay is equal to the duration of one line.

The decoder according to the invention comprises, in its digital video unscrambling circuit, as delay lines, two queues of the "FIFO" type for which there is access to the write/read counter only by their zero reset inputs, and a buffer register.

BRIEF DESCRIPTION OF THE DRAWINGS

The invention will be better understood on reading the detailed description of an embodiment, taken by way of non-limitative example and illustrated by the appended drawing in which.

DESCRIPTION OF THE PREFERRED EMBODIMENTS

Before scrambling, the composite video signal to be transmitted conforms to the CCIR report 624 with regard to the SECAM system.

Figure 1:
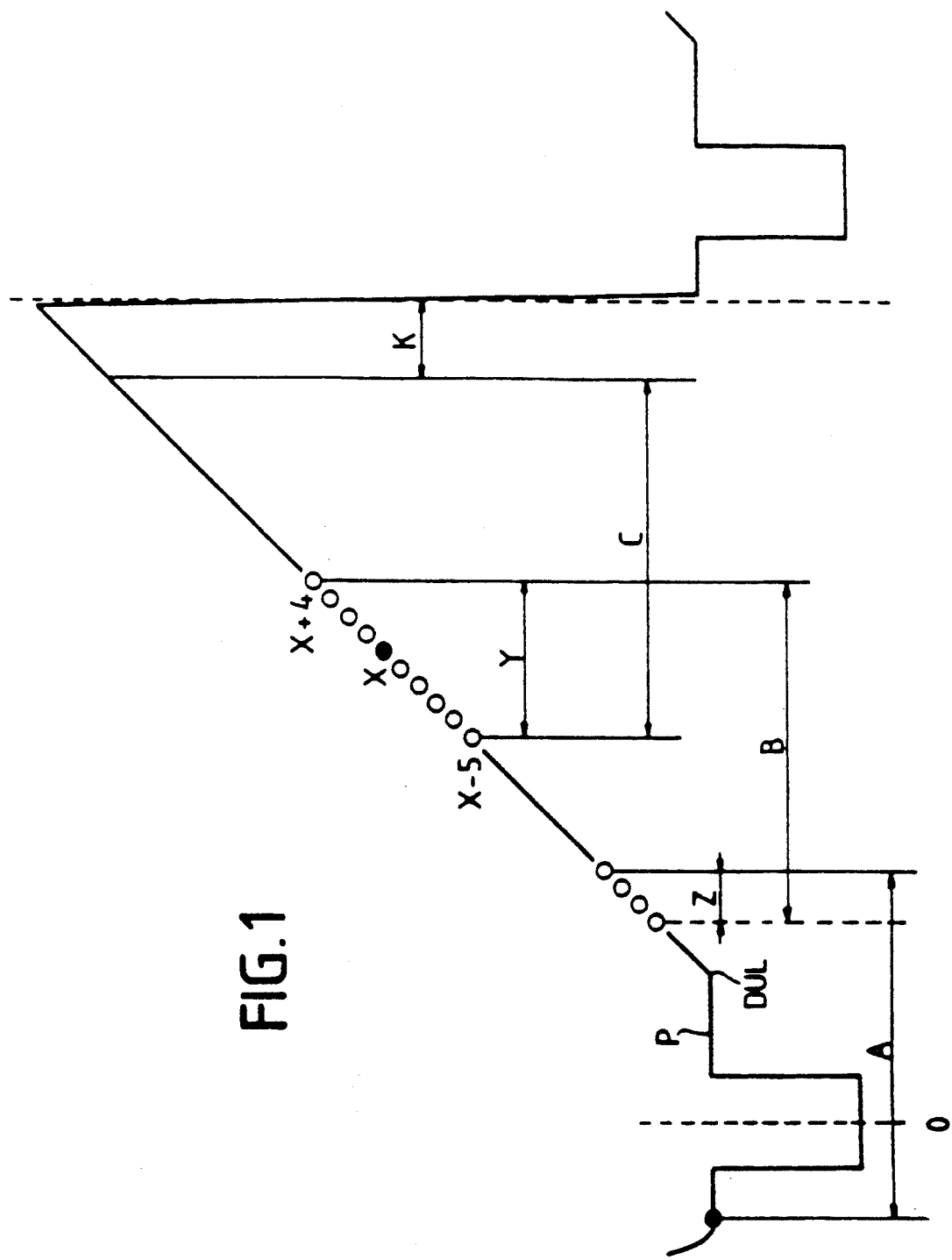
FIG. 1 is a timing diagram of a nonscrambled composite video line.

The temporal reference of this video signal is constituted by the centre of the line synchronization pulse. The sample coinciding with this temporal reference bears the zero number. There are 896 samples per line (sampling clock frequency: 14 MHz). This reference is shown in FIG. 1. In this FIG. 1, X denotes the current point of the line chosen as the break point for the purpose of the scrambling.

Figure 2:
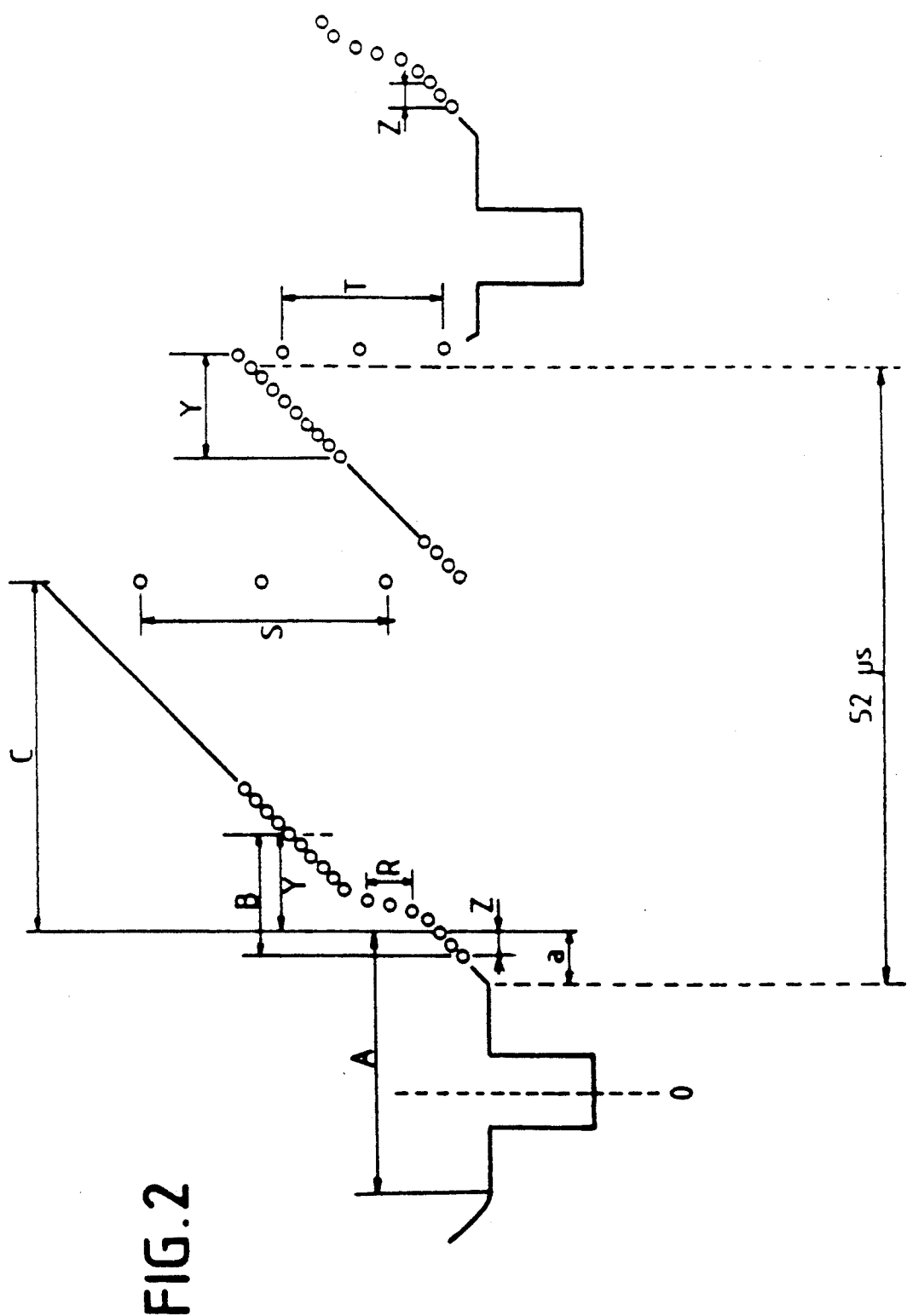
FIG. 2 is a timing diagram of the video line scrambled according to the method of the invention.

The video signal is scrambled by defining two segments in the useful section of the line and by temporarily exchanging the position of these two segments (see FIG. 2). The position of the point defining these two segments is controlled by a pseudo-random generator which can only be used correctly if the access control word has itself been correctly decoded in the decoder. The line suppression interval is not affected by the scrambling.

A video line before scrambling is divided into 3 segments:

1st segment A: this is the line suppression interval which is not scrambled and the sequence of the chrominance subcarrier is in agreement with the frame colour identification sequence.

2nd The segment C corresponding to the end of the useful line, before scrambling.

3rd The segment B corresponding to the start of the useful line, before scrambling.

In FIG. 1 there has also been defined two overlap zones Z and Y whose function will appear in the rest of the description, and an end of active video signal zone K. The definitions and functions of these various segments and zones are given in detail in Table 1.

The segments B and C are transmitted with one line in advance with respect to the subcarrier burst on the line suppression level in order to compensate for the delay introduced in the unscrambling device.

FIG. 2 shows one period of the video signal of FIG. 1 after scrambling according to the method of the invention. This scrambling consists in carrying out, in addition to the permutation about the break point X, a shift (a) (see FIG. 2) of the start of the scrambled zone with respect to the start of the useful section of the line in question: this allows better masking of the position of the break point: the start of the useful section of the line (DUL in FIG. 1), which is at the same time the end of the line suppression level P, is at the black level, and is therefore a video level reference facilitating the detection of the break point. On the other hand, beyond the point DUL, the video level can be of any value and variable and cannot be used as a reference. The scrambling's resistance to pirating is thus increased.

In FIG. 2, the three segments A, B and C together with the previously mentioned zones Y and Z have been marked. Furthermore, three transition zones R, S and T have been marked. These segments and zones are defined in detail in Table 2.

In order to tolerate an uncertainty in the recognition of the temporal reference, a certain number of samples are repeated on either side of the break point. These repeated samples are also used, in association with interpolated points, for preventing the distortions of the artificial transitions introduced in the vicinity of the break point by the distortions of the transmission channel from affecting the quality of the scrambled image.

The use of interpolated points also allows the resistance to any pirating attempt to be increased if one is dealing directly with the physical aspect of the transmitted signal.

Furthermore, the scrambling of the video signal does not totally affect the 52 μs of the duration of the useful signal. In effect, the sample N, representing the first video sample and therefore the first sample submitted to the scrambling is allocated a place shifted to its right. The sample N will thus no longer correspond with a detectable theoretical black level but with a level correlated with the content of the image which, a priori, cannot be predicted.

The segment A, whose duration can be modulated in order to increase immunity to pirating, has the advantage of allowing to remain, on the left hand section of a scrambled image, a non-scrambled zone, generally of small width, but which allows the viewer who is not yet a subscriber to have an idea of the broadcast programme. The modulation of the duration of the segment A, which can for example take place every 40 ms by means of the use of the totality or of a portion of the data constituted by the control word combined with the image counter status data, causes the appearance on the screen of a clear section having a width which varies at a rate of 25 Hz, which is disturbing to the human eye.

In the transition zones R, S, T, the samples in question are shaped in order to smooth these transitions.

The consequence of the repetition of the samples and of the insertion of interpolation samples is that the active part of the line reconstituted after unscrambling is reduced by about 1.2 μs.

The chrominance data identifier which, on transmission before scrambling, precedes the corresponding chrominance data is found again, after unscrambling in the decoder, preceding the chrominance data which preceded it before scrambling: if for example the sequence before scrambling was .../(R−Y)n−1 identifier/ (R−Y)n−1/(B−Y)n identifier/(B−Y)n/(R−Y)n−1 identifier/(R−Y)n−1; the sequence after unscrambling is ... (B−Y)n identifier/(R−Y)n1/(R−Y)n−1 identifier/ (B−Y)n/.... which would produce false colours in the unscrambled lines. In order to prevent this phenomenon, the known decoders comprise delay lines (or equivalent circuits) delaying the chrominance data identifier by one line; these delay lines, in general "FIFO" queues have a considerable cost price.

The invention provides for delaying the chrominance data identifier not in the decoders but in the transmitter and for use, in the decoders, instead of a "FIFO", a simple buffer register whose cost price is distinctly less than that of a "FIFO"; this contrivance has the advantage of causing the transmission of a scrambled signal with false data on the colour of each line.

Figure 3:
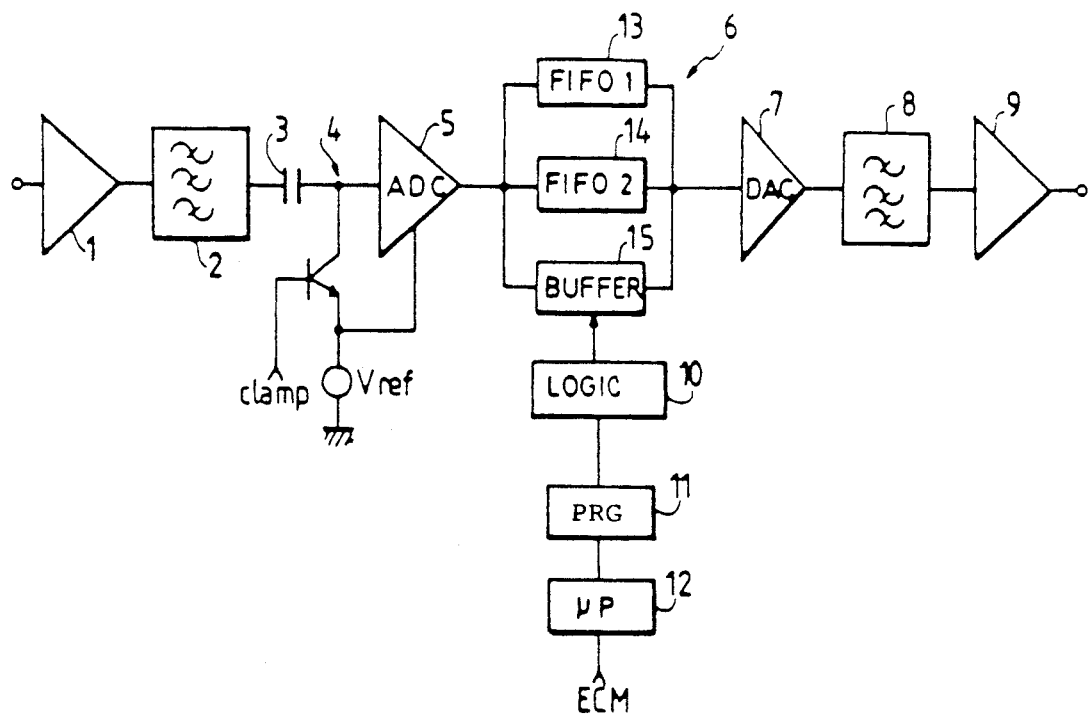
FIG. 3 is a partial block diagram of a decoder according to the invention.

FIG. 3 shows the block diagram of the digital video unscrambling circuit of a decoder according to the invention, with some of the circuits which are connected upstream and downstream of this digital circuit and which are useful for understanding the invention. The other circuits of the decoder are conventional circuits and are not therefore described here.

The video system shown in FIG. 3 successively comprises: an amplifier 1 receiving the signals from a tuner (not shown) a low-pass filter 2, a galvanic isolation capacitor 3, a clamping circuit 4, an analog-digital converter 5, a digital unscrambling circuit 6, a digital-analog converter 7, a low-pass filter 8, and an amplifier 9. The circuit 6 is controlled by a logic circuit 10 which receives values of break points from a pseudo-random generator 11. The generator 11 receives control words from a processor 12 which itself receives access messages ECM from a security device (not shown).

The circuit 6 comprises, in parallel, a first "FIFO" 13, a second "FIFO" 14, and a buffer register 15. The "FIFO"'s are preferably circuits of the NEC make referenced μ PD 41101$_{C-X}$ (where X=1, 2 or 3).

For such "FIFO"'s access to the write/read counter is available only through their zero reset inputs, which implies that the unscrambling of a line J must start at line J−1.

Figure 4:
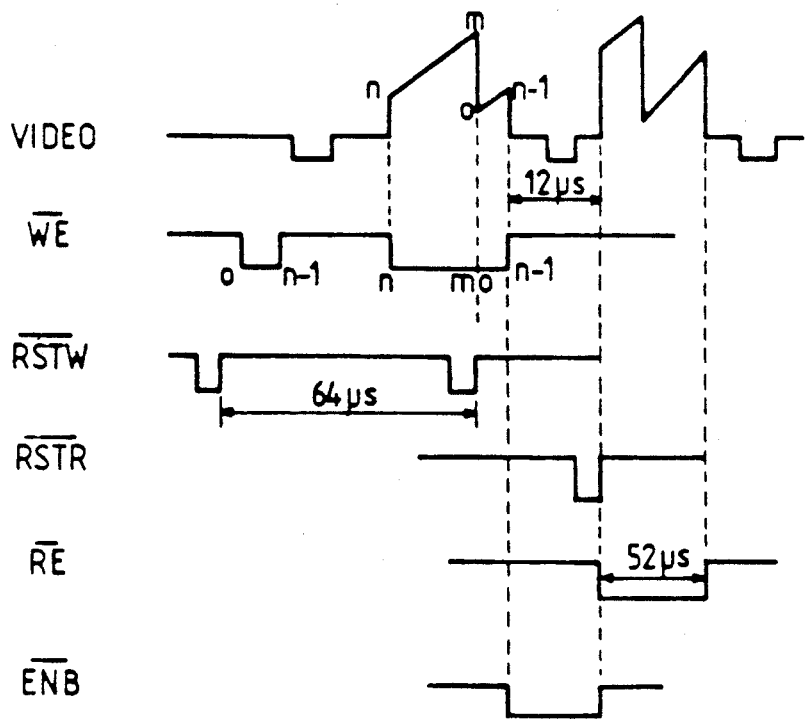
FIG. 4 is a timing diagram of signals appearing in the decoder of FIG. 3.

The principal control signals of the "FIFO"'s 13 and 14 are shown in FIG. 4. These are:

WE: write enable, RSTW: zero reset write, RSTR: zero reset read, and RE: read enable, and ENB: enable buffer register 15.

TABLE 1

| Segment | Definition | Explanations |
| --- | --- | --- |
| A | Line suppression | Transmitted without modification of temporal position |
| B | 1st segment of active video | |
| C | 2nd segment of active video | |
| Z | Overlap zone between the line suppression and active video | Intended to tolerate phase error in the temporal reference and to eliminate distortions due to the transient response of the channel |
| Y | Overlap zone at break point | |
| K | End of active video | Samples not transmitted |

TABLE 2

| Segment | Definition | Explanations |
| --- | --- | --- |
| A | Line suppression | Transmitted without modification of temporal position |
| B | 1st segment of active video | Transmitted with one line in advance and with the position of the 2nd segment |
| C | 2nd segment of active video | Transmitted with one line in advance and with the position of the 1st segment |
| Y | Overlap zone at break point | Samples transmitted at the start of segment C and at the end of segment B |
| Z | Overlap zone | |
| R | Line suppression/ active video transition | |
| S | Active line end/ start transition | |
| T | Active video/line suppression transition | |

We claim:

1. A method of processing PAL and SECAM composite video signals, comprising the steps of:
scrambling the composite video signals by line permutation controlled by a pseudo-random sequence, wherein the pseudo-random sequence is based on a control word with an encoded value incorporated in the composite video signals, the scrambling comprising the step of shifting a start of a scrambed zone of a video signal segment of each line of the composite video signals with respect to a start of each line so that a beginning of video information is not subject to scrambling;

descrambling the scrambled composite video signal by using the pseudo-random sequence which is identical and synchronized with the pseudo-random sequence used in the scrambling step.

2. The method according to claim 1, wherein the shifting of the start of the scrambled zone varies in the course of time.

3. The method according to claim 2, wherein the shifting of the start of the scrambled zone changes value every 40 ms.

4. The method according to any one of claims 1-3 wherein a complete non-scrambled section of each useful line is delayed on transmission and this delay is equal to a duration of one line of the composite video signals.

5. The method according to any one of claims 1-3, wherein interpolation samples are inserted on both sides of a break point in each line of the composite video signals.

6. A decoder for an image transmission system comprising:

a receiver for receiving scrambled composite video signals;

a descrambler for descrambling the scrambled composite video signals, the descrambler comprising in a parallel connection:

two FIFO queues each acting as a delay line and having write/read counters and zero reset inputs, wherein the write/read counters are only accessible by the zero reset inputs; and a buffer register.

7. The decoder according to claim 6, wherein the FIFO queues are of the NEC $\mu$ PD 41101 c−x type (where x = 1, 2 or 3).

* * * * *